United States Patent
Chen et al.

(10) Patent No.: US 10,691,262 B2
(45) Date of Patent: Jun. 23, 2020

(54) PROJECTOR, PROJECTION SYSTEM AND IMAGE PROJECTION METHOD

(71) Applicant: Coretronic Corporation, Hsin-Chu (TW)

(72) Inventors: Yung-Chih Chen, Hsin-Chu (TW); Ying-Hung Lo, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 15/786,607

(22) Filed: Oct. 18, 2017

(65) Prior Publication Data

US 2018/0113567 A1    Apr. 26, 2018

(30) Foreign Application Priority Data

Oct. 21, 2016 (CN) .......................... 2016 1 0917285

(51) Int. Cl.
*G06F 3/042* (2006.01)
*H04N 9/31* (2006.01)
(Continued)

(52) U.S. Cl.
CPC ........... *G06F 3/0421* (2013.01); *G03B 21/10* (2013.01); *G06F 3/0425* (2013.01);
(Continued)

(58) Field of Classification Search
CPC ........ G06F 3/0421; G06F 3/0425; G06F 3/14; G06F 3/1454; G06F 3/04886;
(Continued)

(56) References Cited

U.S. PATENT DOCUMENTS 5,025,314 A * 6/1991 Tang ..................... G06F 3/0425
                                                    178/18.11
5,815,216 A * 9/1998 Suh .......................... H04N 5/45
                                                    348/565
(Continued)

FOREIGN PATENT DOCUMENTS

CN         103309146         9/2013
CN         104219474         12/2014
(Continued)

OTHER PUBLICATIONS

"Office Action of China Counterpart Application," dated Jan. 21, 2019, p. 1-p. 14.
(Continued)

Primary Examiner — Brian P Yenke
(74) Attorney, Agent, or Firm — JCIPRNET

(57) ABSTRACT

A projector, a projection system and an image projection method are provided. The projector includes an image processing circuit, a processor circuit and a memory circuit. The image processing circuit is configured to adjust a first image. The processor circuit is electrically connected to the image processing circuit. The processor circuit is configured to combine the first image with a second image in a first display mode of the projector. The memory circuit is electrically connected to the processor circuit. The memory circuit is configured to store the second image. The projector projects a display image formed by combining the first image and the second image to a projection target.

13 Claims, 7 Drawing Sheets

(51) Int. Cl.
*G03B 21/10* (2006.01)
*G03B 21/26* (2006.01)

(52) U.S. Cl.
CPC ......... *H04N 9/3179* (2013.01); *H04N 9/3185* (2013.01); *H04N 9/3194* (2013.01); *G03B 21/26* (2013.01)

(58) Field of Classification Search
CPC ............ G06F 2203/0383; G03B 21/26; H04N 9/3185; H04N 9/3194; H04N 7/147; H04N 21/422
See application file for complete search history.

(56) References Cited

U.S. PATENT DOCUMENTS

| | | | | |
|---|---|---|---|---|
| 5,831,664 | A * | 11/1998 | Wharton | H04N 7/163 725/81 |
| 5,990,932 | A * | 11/1999 | Bee | G16H 80/00 348/14.08 |
| 6,493,008 | B1 * | 12/2002 | Yui | G09G 5/08 348/E5.104 |
| 6,574,674 | B1 * | 6/2003 | May | G06F 9/542 709/204 |
| 7,057,635 | B1 * | 6/2006 | Naden | H04N 5/74 345/169 |
| 7,864,249 | B2 | 1/2011 | Kim | |
| 7,972,010 | B2 * | 7/2011 | Miyasaka | G03B 21/26 353/42 |
| 8,099,662 | B2 * | 1/2012 | Ivashin | G06F 17/241 715/230 |
| 8,794,768 | B2 | 8/2014 | Ozawa | |
| 8,919,963 | B2 * | 12/2014 | Yasuda | H04N 9/3197 348/135 |
| 8,985,777 | B2 * | 3/2015 | Akiba | H04N 9/3185 348/14.07 |
| 9,041,695 | B2 * | 5/2015 | Ichieda | G06F 3/0425 345/204 |
| 9,292,945 | B2 * | 3/2016 | Kubota | G06T 11/003 |
| 9,310,938 | B2 * | 4/2016 | Ichieda | G06F 3/0425 |
| 9,400,562 | B2 * | 7/2016 | Takazawa | G06F 3/017 |
| 9,665,335 | B2 * | 5/2017 | Eguchi | G06F 3/1454 |
| 9,743,052 | B2 * | 8/2017 | Fukuchi | H04N 9/3147 |
| 9,785,244 | B2 * | 10/2017 | Sato | G06F 3/017 |
| 9,791,947 | B2 * | 10/2017 | Sugimoto | G06F 3/0488 |
| 9,930,307 | B1 * | 3/2018 | Kursula | H04N 17/002 |
| 10,437,544 | B2 * | 10/2019 | Tomita | G06F 3/0545 |
| 10,565,891 | B2 * | 2/2020 | Nakashin | G09B 5/02 |
| 2005/0099405 | A1 * | 5/2005 | Dietz | G06F 3/0321 345/179 |
| 2006/0089197 | A1 * | 4/2006 | Ajioka | A63F 13/06 463/31 |
| 2006/0285077 | A1 * | 12/2006 | Miyasaka | G03B 21/26 353/30 |
| 2009/0273715 | A1 * | 11/2009 | Casper | H04N 5/268 348/578 |
| 2010/0231556 | A1 * | 9/2010 | Mines | G06F 3/0418 345/178 |
| 2011/0001701 | A1 * | 1/2011 | Nakano | G02B 27/026 345/157 |
| 2011/0050640 | A1 * | 3/2011 | Lundback | G06F 3/041 345/175 |
| 2011/0169778 | A1 * | 7/2011 | Nungester | G06F 3/03542 345/175 |
| 2012/0212647 | A1 * | 8/2012 | Ueno | G03B 17/54 348/231.99 |
| 2012/0235934 | A1 * | 9/2012 | Kawasaki | G06F 3/03545 345/173 |
| 2012/0287044 | A1 * | 11/2012 | Bell | G06F 3/011 345/158 |
| 2012/0287090 | A1 * | 11/2012 | Cacioppo | G06F 3/043 345/179 |
| 2013/0106908 | A1 * | 5/2013 | Ichieda | G09G 3/02 345/629 |
| 2013/0162607 | A1 * | 6/2013 | Ichieda | G03B 21/14 345/204 |
| 2013/0265551 | A1 * | 10/2013 | Yamano | G03B 21/14 353/30 |
| 2013/0342576 | A1 * | 12/2013 | Kubota | G06T 11/003 345/634 |
| 2014/0253433 | A1 * | 9/2014 | Sato | G06F 3/017 345/156 |
| 2015/0015504 | A1 * | 1/2015 | Lee | G06F 3/04845 345/173 |
| 2015/0015583 | A1 * | 1/2015 | Watanabe | G06F 3/0482 345/428 |
| 2015/0049309 | A1 * | 2/2015 | Sumiyoshi | G03B 21/26 353/31 |
| 2015/0070389 | A1 * | 3/2015 | Goto | G06T 7/00 345/633 |
| 2015/0077356 | A1 | 3/2015 | Choi et al. | |
| 2015/0199166 | A1 * | 7/2015 | Eguchi | G06F 3/1454 345/2.2 |
| 2015/0227262 | A1 * | 8/2015 | Ichieda | G03B 21/14 345/204 |
| 2015/0237317 | A1 * | 8/2015 | Ehara | H04N 9/3185 348/745 |
| 2015/0237319 | A1 * | 8/2015 | Tsai | G03B 21/208 345/175 |
| 2015/0277717 | A1 * | 10/2015 | Barabash | G06F 3/04845 715/769 |
| 2016/0140690 | A1 * | 5/2016 | Natori | G06F 3/1415 345/667 |
| 2016/0150205 | A1 * | 5/2016 | Maeda | G06T 11/60 348/745 |
| 2016/0188151 | A1 * | 6/2016 | Xu | G06F 3/04842 715/863 |
| 2016/0191576 | A1 * | 6/2016 | Thompson | H04L 65/403 709/204 |
| 2016/0295184 | A1 * | 10/2016 | Ishikawa | H04N 9/3185 |
| 2016/0353068 | A1 * | 12/2016 | Ishikawa | H04N 9/3147 |
| 2016/0378272 | A1 * | 12/2016 | Whitlark | G06F 3/0481 715/750 |
| 2017/0003803 | A1 * | 1/2017 | Chen | G06F 3/0416 |
| 2017/0011713 | A1 * | 1/2017 | Hsu | G06F 3/1454 |
| 2017/0099473 | A1 * | 4/2017 | Nakaguchi | G03B 43/00 |
| 2017/0102784 | A1 * | 4/2017 | Ano | G06F 3/0416 |
| 2017/0147153 | A1 * | 5/2017 | Gu | G06F 3/0425 |
| 2017/0171521 | A1 * | 6/2017 | Jung | H04N 9/3194 |
| 2017/0205961 | A1 * | 7/2017 | Chen | G06F 3/0383 |
| 2017/0235425 | A1 * | 8/2017 | Chen | G06F 3/0418 345/175 |
| 2017/0300176 | A1 * | 10/2017 | Chen | G06F 3/0425 |
| 2017/0329459 | A1 * | 11/2017 | Ishihara | G03B 21/008 |
| 2018/0005606 | A1 * | 1/2018 | Mori | G09G 5/377 |
| 2018/0046324 | A1 * | 2/2018 | Hung | G06F 3/0418 |
| 2018/0059863 | A1 * | 3/2018 | Li | G06F 3/0418 |
| 2018/0061262 | A1 * | 3/2018 | Nakashin | G06F 3/048 |
| 2018/0150273 | A1 * | 5/2018 | Tomita | G06F 3/1423 |
| 2019/0034045 | A1 * | 1/2019 | Chen | G06F 3/0482 |
| 2019/0155563 | A1 * | 5/2019 | Kotani | H04W 4/80 |
| 2019/0219907 | A1 * | 7/2019 | Kurota | G06F 3/04883 |
| 2019/0361332 | A1 * | 11/2019 | Kurota | H04N 9/317 |

FOREIGN PATENT DOCUMENTS

| | | |
|---|---|---|
| CN | 104849949 | 8/2015 |
| CN | 104849950 | 8/2015 |
| CN | 105378599 | 3/2016 |
| CN | 105388694 | 3/2016 |
| JP | 2011081188 | 4/2011 |

OTHER PUBLICATIONS

"Office Action of China Counterpart Application," dated Jun. 17, 2019, p. 1-p. 16.

* cited by examiner

PROJECTOR, PROJECTION SYSTEM AND IMAGE PROJECTION METHOD

CROSS-REFERENCE TO RELATED APPLICATION

This application claims the priority benefit of China application serial no. 201610917285.4, filed on Oct. 21, 2016. The entirety of the above-mentioned patent application is hereby incorporated by reference herein and made a part of this specification.

BACKGROUND OF THE INVENTION

Field of the Invention

The invention relates to an optical device, an optical system and a projection method, and particularly relates to a projector, a projection system and an image projection method.

Description of Related Art

Generally, after a conventional projector is connected to a host system, through a proper setting, an image displayed on the host system can be projected onto a predetermined projection target. In a specific application, the projection target is probably hard to collaborate with environment to form a harmonic operating system. For example, in the application of education field, a conventional handwriting board such as a blackboard or a whiteboard is used in collaboration with a projector to project images to a projection screen, by which although an education system is constructed, the projection screen is generally disposed at a fixed position, and cannot be arbitrarily moved, which may cause use inconvenience. In the existing techniques, a display apparatus can be used to replace the projection screen and the projection, and by using a sliding rail system, the display apparatus and the conventional handwriting board such as the blackboard or the whiteboard are combined to provide a function of image combination and image movement. However, the sliding rail system is complicated and has a high price, and if it is required to entirely present information of the conventional handwriting board such as the blackboard or the whiteboard in a user's field of vision, or entirely present the image of the digital display in usage, switching thereof has a certain degree of difficulty.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention were acknowledged by a person of ordinary skill in the art.

SUMMARY OF THE INVENTION

The invention is directed to a projector, a projection system and an image projection method so as to decrease a setup cost of the projection system (labor cost) and easily move a position of a display image on a projection target.

Other objects and advantages of the invention can be further illustrated by the technical features broadly embodied and described as follows.

In order to achieve one or a portion of or all of the objects or other objects, an embodiment of the invention provides a projector including an image processing circuit, a processor circuit and a memory circuit. The image processing circuit is configured to adjust a first image. The processor circuit is electrically connected to the image processing circuit. The processor circuit is configured to combine the first image with a second image in a first display mode of the projector. The memory circuit is electrically connected to the processor circuit. The memory circuit is configured to store the second image. The projector projects a display image formed by combining the first image and the second image to a projection target.

In order to achieve one or a portion of or all of the objects or other objects, another embodiment of the invention provides an image projection method, which is adapted to a projector. The image projection method includes: receiving a first image output by a host system, and adjusting the first image; combining the first image with a second image in a first display mode of the projector, where the second image is stored in the projector; and projecting a display image formed by combining the first image and the second image to a projection target in the first display mode of the projector.

In order to achieve one or a portion of or all of the objects or other objects, another embodiment of the invention provides a projection system including a projector, a host system and a touch device. The projector is configured to adjust a first image. The projector combines the first image with a second image in a first display mode. The projector stores the second image. The projector projects a display image formed by combining the first image and the second image to a projection target. The host system is electrically connected to the projector. The host system is configured to display the first image. The projector receives the first image from the host system. The touch device is electrically connected to the projector and the host system. The touch device is configured to output a touch signal. The projector displays touch information on the second image or the display image formed by combining the first image and the second image according to the touch signal.

According to the above description, the embodiments of the invention have at least one of following advantages or effects. In the embodiment of the invention, the projector pre-stores the second image, and combines the first image with the second image in the first display mode, so as to decrease the setup cost of the projection system, and is easy to switch a mode.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

In the following detailed description of the preferred embodiments, reference is made to the accompanying drawings which four a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

A plurality of embodiments is provided below to describe the invention, though the invention is not limited to the provided embodiments, and the provided embodiments can be suitably combined. A term "couple" used in the full text of the disclosure (including the claims) refers to any direct and indirect connections. For example, if a first device is described to be coupled to a second device, it is interpreted as that the first device is directly coupled to the second device, or the first device is indirectly coupled to the second device through other devices or connection means. Moreover, a term "signal" refers to at least a current, a voltage, a charge, a temperature, data, an electromagnetic wave or any other one or more signals.

Figure 1:
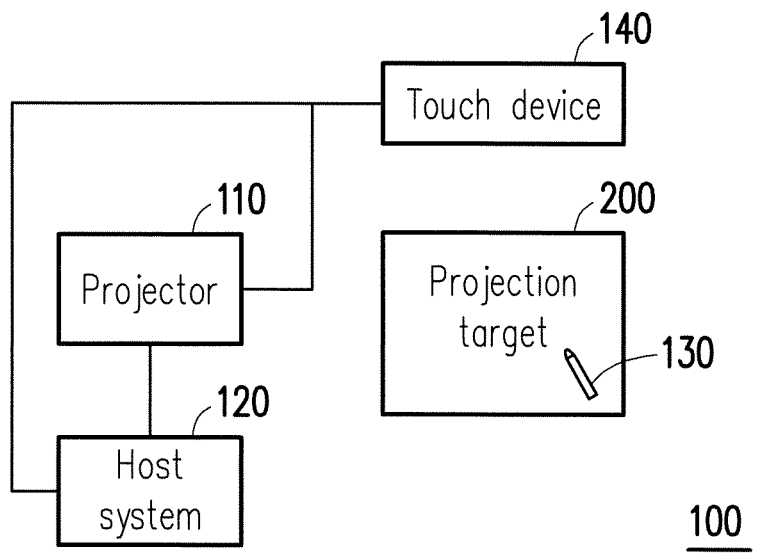
FIG. 1 is a schematic diagram of a projection system according to an embodiment of the invention.
Figure 2:
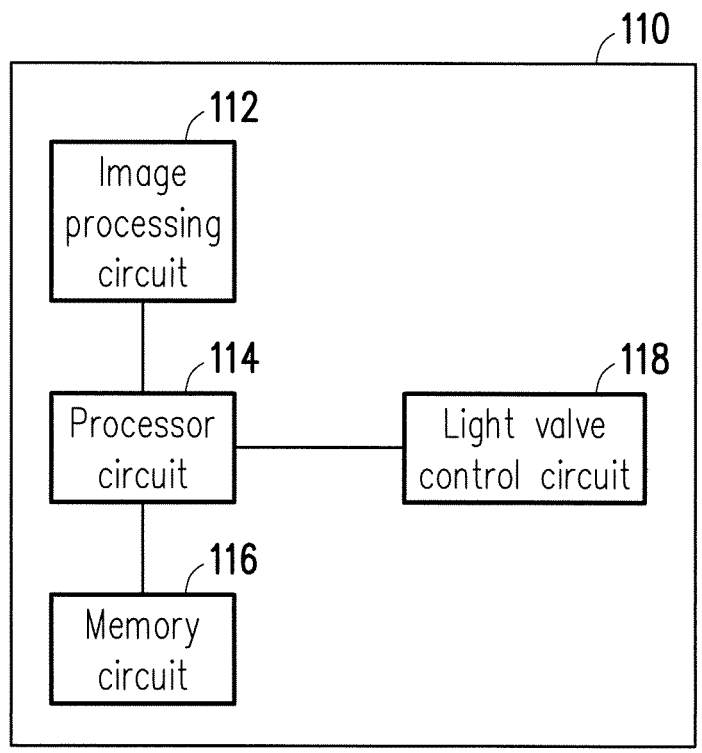
FIG. 2 is a schematic diagram of a projector of FIG. 1.

FIG. 1 is a schematic diagram of a projection system according to an embodiment of the invention. FIG. 2 is a schematic diagram of a projector according to an embodiment of the invention. Referring to FIG. 1 and FIG. 2, the projection system 100 of the embodiment includes a projector 110, a host system 120 and a touch device 140. In the embodiment, the projector 110 includes an image processing circuit 112, a processor circuit 114, a memory circuit 116 and a light valve control circuit 118, etc.. The projector 110 is, for example, a liquid crystal display (LCD) projector, a digital light processor (DLP) projector or an ultra-short throw projector, etc., which is adapted to project an image onto a projection target 200.

In the embodiment, the touch device 140 is electrically connected to the projector 110 and the host system 120. In the front of the projection target 200, an user may use a touch object 130 to touch or approach to the projection target 200, where the touch object can be an active or reflective stylus, a user's hand or a user's gesture close to the projection target 200, and the touch device 140 may capture position information of the touch object on the projection target 200, where the touch device 140 is described in detail later. The touch device 140 transmits the captured position information to the host system 120, and the host system 120 performs coordinate conversion. For example, the host system 120 converts the coordinates of the position information into projection coordinates of the projector. Then, the host system 120 combines touch information corresponding to the projection coordinates of the projector with the original image to form a first image. The host system 120 transmits the first image to the image processing circuit 112 of the projector 110.

In the embodiment, the host system 120 has a display screen (not shown), which is adapted to display the first image, and the host system 120 transmits a signal of the first image to the projector 110, and the projector 110 projects the first image to the projection target 200.

Before the projection, the image processing circuit 112 receives the signal of the first image from the host system 120, and adjusts an aspect ratio of the first image to fit a display size within capability range of the projector, for example, to decrease or enlarge the size of the first image (4:3, 16:9, 16:6 or 21:9), such that the first image is adapted to be projected to the projection target 200.

In the embodiment, the light valve control circuit 118 is, for example, a DDP series chip of Texus Instrument, and is configured to a control micro electromechanical system (MEMS)-based optical device, for example, a digital micromirror device (DMD), i.e. the commonly known light valve, and a liquid crystal display panel (LCD panel), so as to project an image beam to the projection target 200.

In the embodiment, the projector 110 has a plurality of different display modes, for example, a first display mode, a second display mode and a third display mode. In the first display mode, the processor circuit 114 of the projector 110 combines the first image with a second image, and the projector 110 projects a display image formed by combining the first image and the second image to the projection target 200, where the second image can be pre-stored in the memory circuit 116 of the projector 110, though the invention is not limited thereto. In the second display mode, the projector 110 projects the first image displayed on the display screen of the host system 120 on the projection target 200. In the third display mode, the projector 110 projects the second image pre-stored in the memory circuit 116 of the projector 110 to the projection target 200.

In the embodiment, the image processing circuit 112 and the processor circuit 114 are, for example, respectively implemented by a scalar, a field-programmable gate array (FPGA), a central processing unit (CPU), a microprocessor, a scalar of image size, a digital signal processor (DSP), a programmable controller, a programmable logic device (PLD) or other similar devices or a combination of these devices, which is not limited by the invention. Moreover, in the embodiment, the memory circuit 116 can be implemented by any memory structure of the related technical field, which is not limited by the invention, and since enough instructions and recommendations for the structure and implementation method thereof can be learned from ordinary knowledge of the technical field, detailed description thereof is not repeated. For example, the memory circuit 116 can be one of a plurality of following memories: a volatile memory (for example, a dynamic random-access memory (DRAM), a static RAM (SRAM) or a synchronous dynamic RAM (SDRAM)), a non-volatile memory (for example, a one-time programmable read-only memory (OTPROM), a programmable ROM (PROM), an erasable and programmable ROM (EPROM), an electrically erasable and programmable ROM (EEPROM), a mask ROM and a flash ROM), a hard disk drive (HDD) and a solid-state driver (SSD).

In the embodiment, the host system 120 is, for example, a portable electronic device suitable for independent operation, such as a smart phone, a wearable electronic device, a tablet personal computer, a personal digital assistant (PDA) or an electronic device having a system control function such as a notebook computer, etc., or a smart robot, a central control system, a cloud server control center, a desktop computer, etc., which is not limited by the invention.

Figure 3:
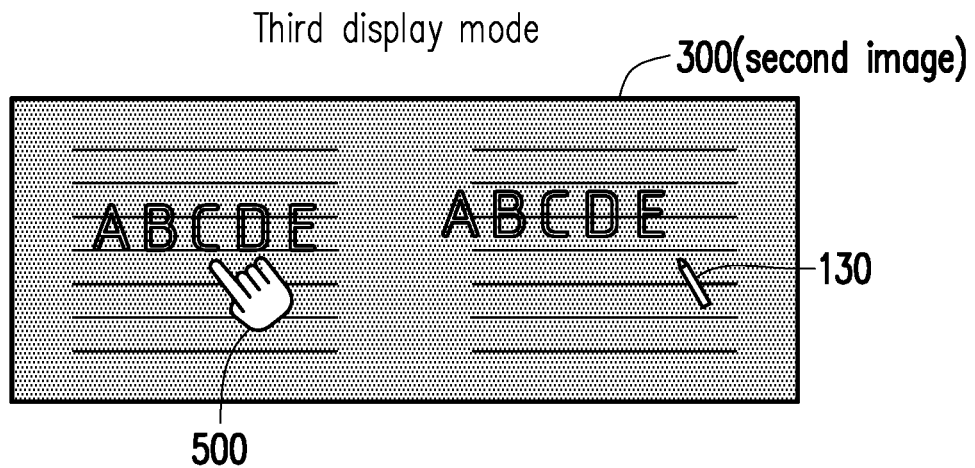
FIG. 3 is a schematic diagram of a second image according to an embodiment of the invention.

FIG. 3 is a schematic diagram of a second image according to an embodiment of the invention. Referring to FIG. 1 to FIG. 3, in the embodiment, the projection target is, for example, a physical blackboard, a physical whiteboard, wall or a projection screen (not shown), which is not limited by the invention, and the second image stored in the memory circuit 116 is, for example, a predetermined image. For example, the predetermined image can be a pattern with a plurality of line sections, or a pattern with a five-line staff, so as to save a time for drawing a fixed pattern. The second image 300 of the embodiment is, for example, the predetermined image with a pattern of a plurality of line segments. The projector 110 projects the second image 300 to the physical blackboard, and regardless of whether the first image provided by the host system 120 is combined with the second image, the projector 110 may combine touch information provided by the host system 120 with the second image 300 for displaying on the physical blackboard. The touch information, for example, includes notes and labels displayed on the second image according to the user's touch operation, for example, character symbols (for example, English letters) shown in FIG. 3. The touch information is only an example, and the invention is not limited thereto. In the third display mode, the projector 110, for example, projects the second image 300 pre-stored in the memory circuit 116 to the projection target 200.

Figure 4:
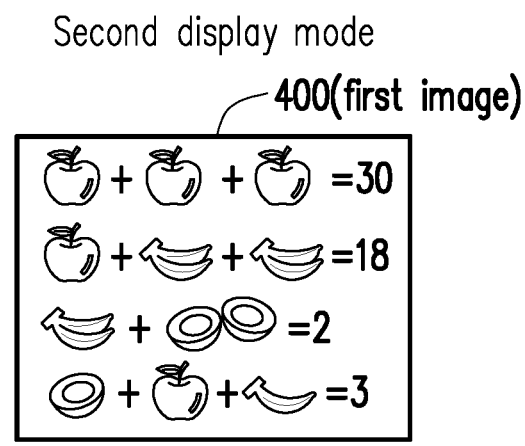
FIG. 4 is a schematic diagram of a first image according to an embodiment of the invention.

FIG. 4 is a schematic diagram of the first image according to an embodiment of the invention. Referring to FIG. 4, the first image 400 of the embodiment is, for example, an image projected on the projection target 200 by the projector 110. The image information displayed by the first image 400 is, for example, related to or not related to the touch information on the second image (not shown), which is not limited by the invention. Therefore, in the second display mode, the projector 100 projects the first image 400 onto the projection target 200, and the first image 400 may be displayed on the display screen of the host system 120.

Figure 5:
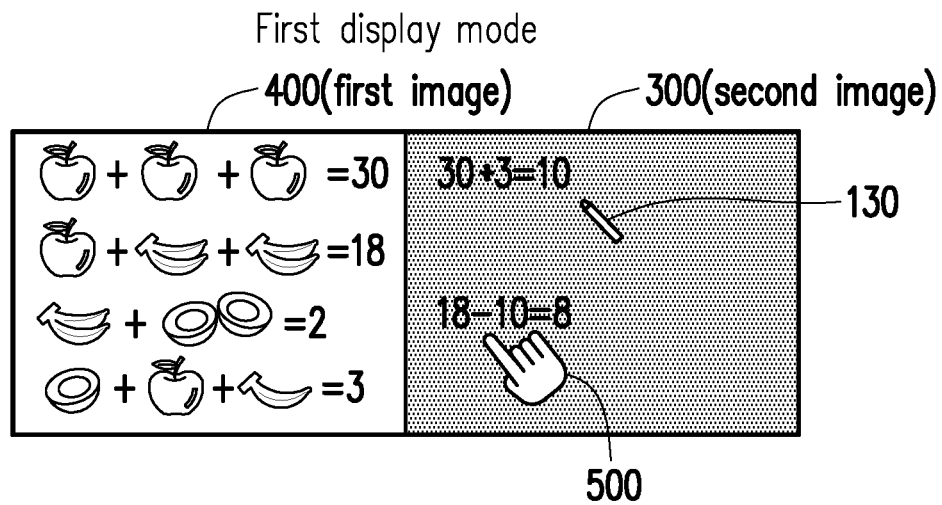
FIG. 5, FIG. 6 and FIG. 7 are respectively schematic diagrams of a combination of a first image and a second image according to different embodiments of the invention.
Figure 6:
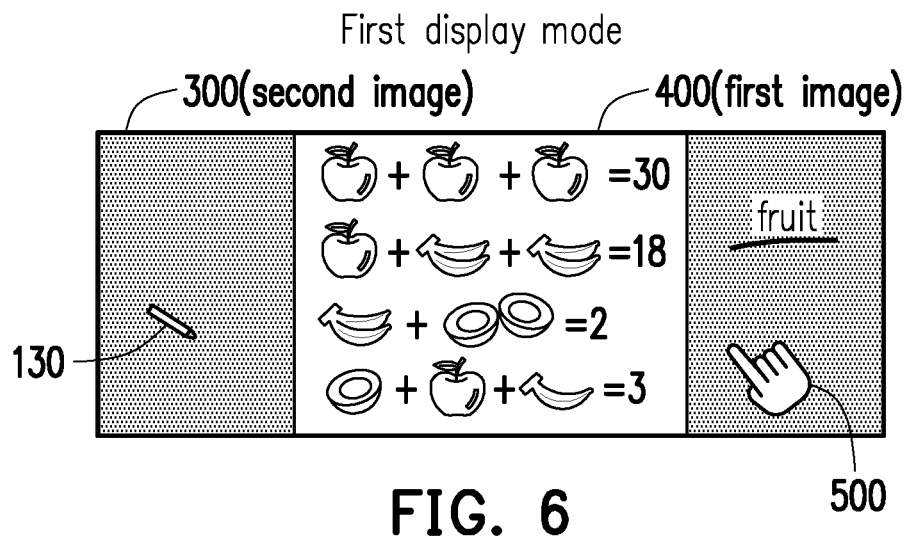
Figure 7:
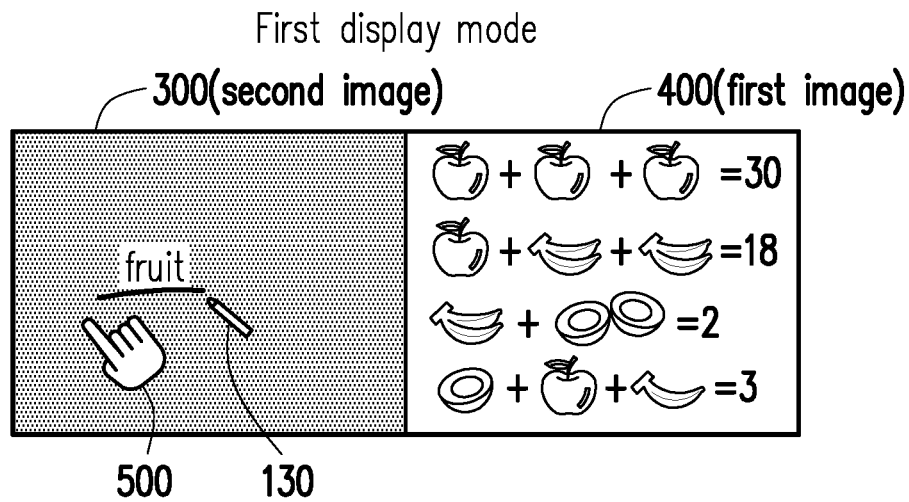

FIG. 5, FIG. 6 and FIG. 7 are respectively schematic diagrams of a combination of a first image and a second image according to different embodiments of the invention. Referring to FIG. 5, FIG. 6 and FIG. 7, in the first display mode, the processor circuit 114 combines the first image 400 with the second image 300, and the projector 110 projects the display image formed by combining the first image 400 and the second image 300 to the projection target 200. FIG. 5, FIG. 6 and FIG. 7 respectively show different positions of the first image 400 combined with the second image 300, for example, the first image 400 is respectively located at a left part, a central part and a right part of the second image 300, in other words, a single position of the first image 400 fixed to and relative to the second image 300, though the invention is not limited thereto. The processor circuit 114 controls a relative position of the first image 400 combined to the second image 300 according to a control signal. In the embodiment, the control signal is, for example, one of a touch signal provided by a gesture 500 or the touch device 140 and an output signal of a remote controller. For example, the gesture 500 is, for example, an operation that the user waves a hand in front of the projection target 200 when the user operates the projection system 100, and the touch signal sensed by touch device 140 may serve as the control signal. The touch signal is, for example, a signal obtained by the touch device 140 when the user touches the projection target 200 through, for example, a touch object (stylus) 130, etc., which may refer to related description of FIG. 10 and FIG. 11. The output signal of the remote controller is, for example, a signal output by the remote controller (not shown), which may serve as the control signal. The remote controller may not only perform a general projection control operation to the projector 110, but may also control a position of the first image 400 combined with the second image 300. Therefore, in the first display mode, the projector 110 projects the display image formed by combining the first image 400 and the second image 300 to the projection target 200, and the processor circuit 114 provides the image information to the light valve control circuit 118 according to the control signal, where the image information represents a signal of the display image formed by combining the first image 400 and the second image 300, such that the light valve control circuit 118 may control a light valve (not shown) to project the display image formed by combining the first image 400 and the second image 300 to the projection target 200. According to the above description, it is known that the processor circuit 114 may dynamically adjust the position of the first image 400 relative to the second image 300 through the light valve control circuit 118 according to the control signal. The control signal may be corresponds to the touch signal.

Figure 8:
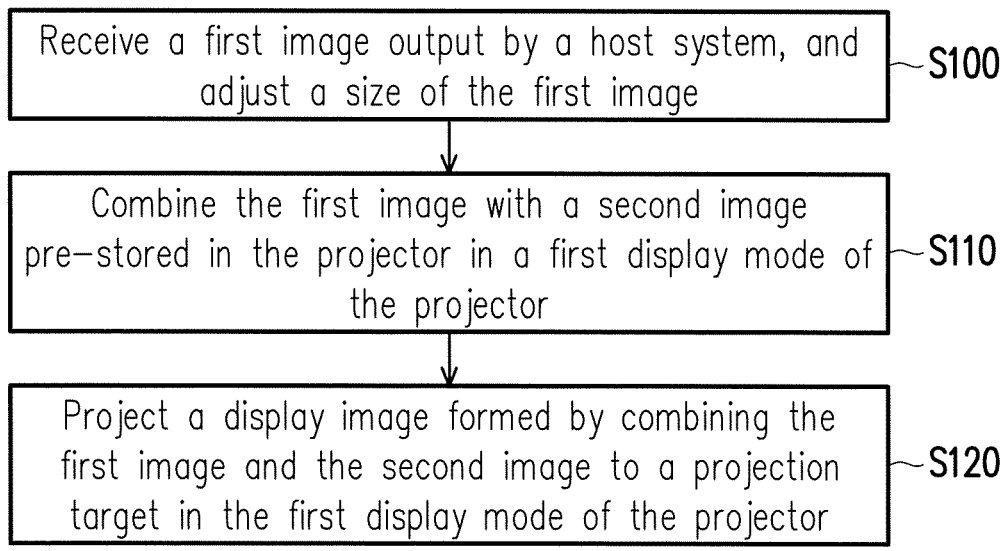
FIG. 8 is a flowchart illustrating an image projection method according to an embodiment of the invention.

FIG. 8 is a flowchart illustrating an image projection method according to an embodiment of the invention. Referring to FIG. 8, the image projection method of the embodiment is adapted to the projection system 100 and the projector 110 of FIG. 1 and FIG. 2. Taking the projection system 100 and the projector 110 of FIG. 1 and FIG. 2 as an example, in step S100, the projector 110 receives the first image 400 output by the host system 120, and adjusts a size of the first image 400. In step S110, in the first display mode, the projector 110 combines the first image 400 with the pre-stored second image 300. In step S120, in the first display mode, the projector 110 projects the display image formed by combining the first image 400 and the second image 300 to the projection target 200. Moreover, since enough instructions and recommendations for the image projection method of the embodiment of the invention may be learned from the description of the embodiments of FIG. 1 to FIG. 7, detailed description thereof is not repeated.

Figure 9:
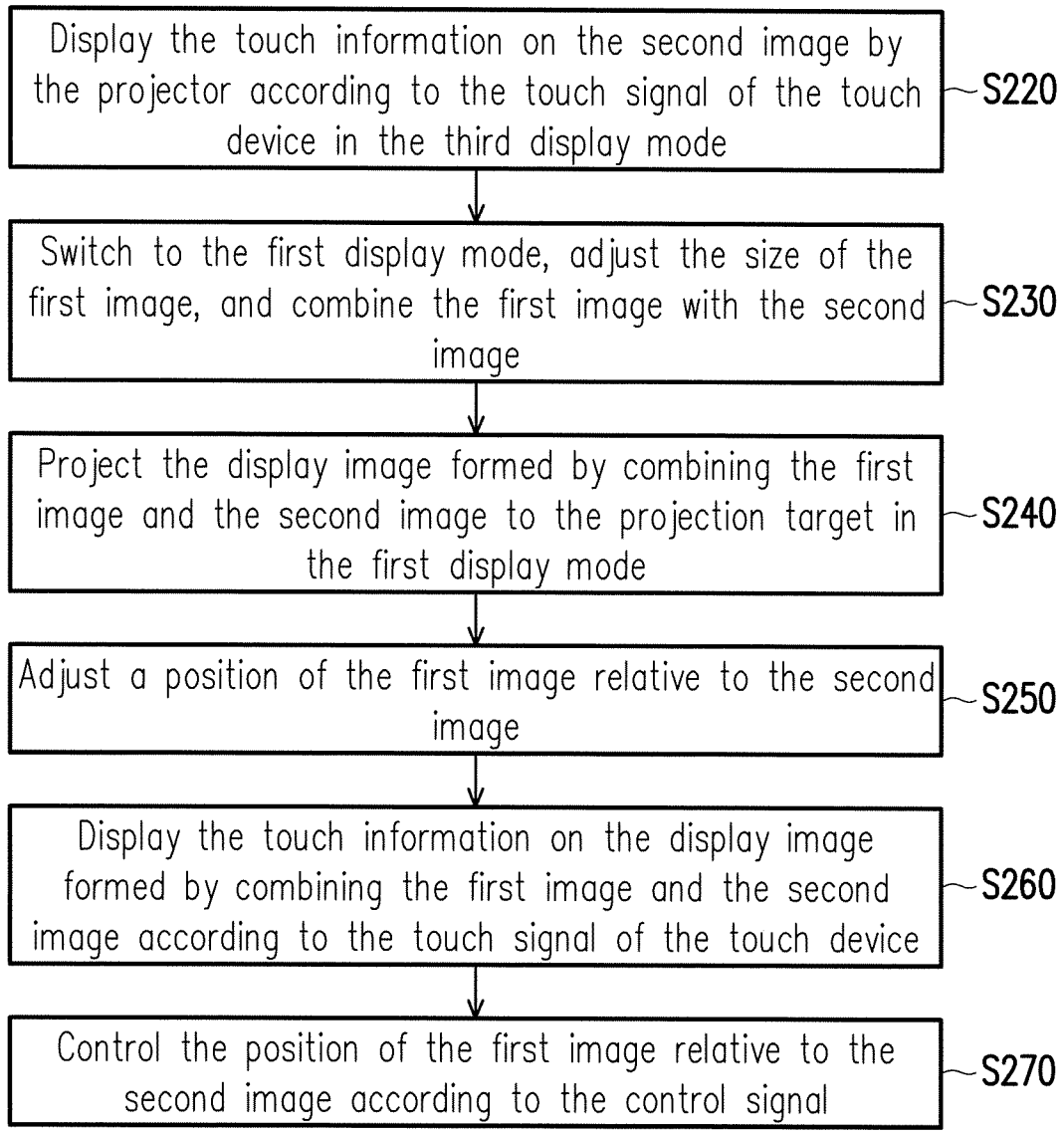
FIG. 9 is a flowchart illustrating an image projection method according to another embodiment of the invention.

FIG. 9 is a flowchart illustrating an image projection method according to another embodiment of the invention. Referring to FIG. 9, the image projection method of the embodiment is adapted to the projection system 100 and the projector 110 of FIG. 1 and FIG. 2. Taking the projection system 100 and the projector 110 of FIG. 1 and FIG. 2 as an example, in the embodiment, the projector is, for example, preset to activate a third display mode after turning on the projector, in step, the projector 110 projects the pre-stored second image 300 to the projection target 200. In one step, the projector 110 determines whether to receive the first image from the host system 120. If not, the projector 110 executes a step S220. In the step S220, in the third display mode, the projector 110 displays the touch information on the second image 300 according to the touch signal of the touch device 140, i.e. the second image 300 is combined with the touch information for displaying on the projection target 200. If yes, the step S110 executes a step S230.

In the step S230, the projector 110 switches the display mode from the third display mode to the first display mode, and the projector 110 adjusts the size of the first image, and combines the first image 400 with the second image 300. In step S240, in the first display mode, the projector 110 projects the display image formed by combining the first image 400 and the second image 300 to the projection target 200. Then, in step S250, the projector 110 determines whether to adjust a position of the first image 400 relative to the second image 300. If not, in step S260, the projector 110 displays the touch information on the display image formed by combining the first image 400 and the second image 300 according to the touch signal of the touch device 140. If yes, in step S270, the projector 110 controls the position of the first image 400 relative to the second image 300 according to the control signal. After the position of the first image 400 is determined, the projector 110 executes a step S260. If necessary, the projector 110 may return back to the step S250 from the step S260 to again determine whether the position of the first image 400 is required to be adjusted.

Figure 10:
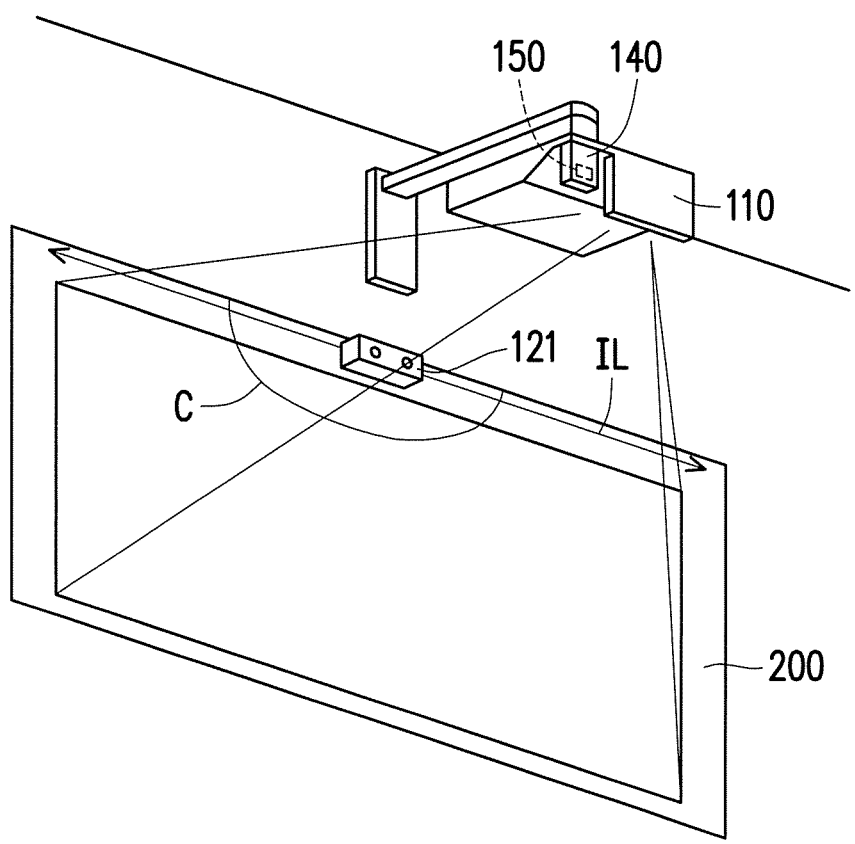
FIG. 10 is a schematic diagram of a part of a projection system according to an embodiment of the invention.

FIG. 10 is a schematic diagram of a part of a projection system according to an embodiment of the invention. Referring to FIG. 10, a part of the projection system 100' includes the projector 110, an invisible light emitter 121 and the touch device 140. The touch device 140 includes a processing unit 150, and the processing unit 150 is electrically coupled to the projector 110. In some embodiments, the processing unit 150 may be independent to the touch device 140, and is electrically coupled to the touch device 140, and the touch device 140 is, for example, disposed in the projector 110, though the invention is not limited thereto. The processing unit 150 can be a central processing unit (CPU), a microprocessor, a digital signal processor (DSP), a programmable controller, a programmable logic device (PLD) or other similar devices or a combination of these devices, which is not limited by the invention.

The projector 110 may project a projection image onto the projection target 200. The invisible light emitter 121 is, for example, a laser light emitter (an infrared light laser emitter), and is used for producing an invisible light curtain C parallel to the projection target 200 to cover the entire projection target 200 and form a touch region corresponding to the projection image. The invisible light emitter 121 may be disposed at an edge of the projection image, for example, disposed adjacent to a middle position of an upper edge of the projection image. The invisible light emitter 121 emits an invisible light IL, and the invisible light IL is scattered to be parallel to the projection target 200 to form the invisible light curtain C. The invisible light curtain C covers the projection image to form the touch region. In the embodiment, the invisible light curtain C at least covers the entire projection image, and the configuration position of the invisible light emitter 121 and a scattered angle of the invisible light IL may determine a size of the invisible light curtain C, which is not limited by the invention. Moreover, the invisible light emitter 121 may also produce the invisible light curtain C by producing a reflected light or through other proper optical components, which is not limited by the invention.

The touch device 140 is, for example, a camera, a video camera, an optical sensor (for example, to sense level of brightness) or other image or signal capturing device. For example, the touch device 140 is disposed on the projector 110, and is used for capturing a touch image towards a direction of the projection target 200. Moreover, the touch device 140 can be used for sensing a reflected light spot produced by a touch object (for example, user's finger or a stylus, etc.) contacting the invisible light curtain C in the touch region, so as to implement a touch sensing function. Therefore, the image captured by the touch device 140 may actually cover the touch region.

Figure 11:
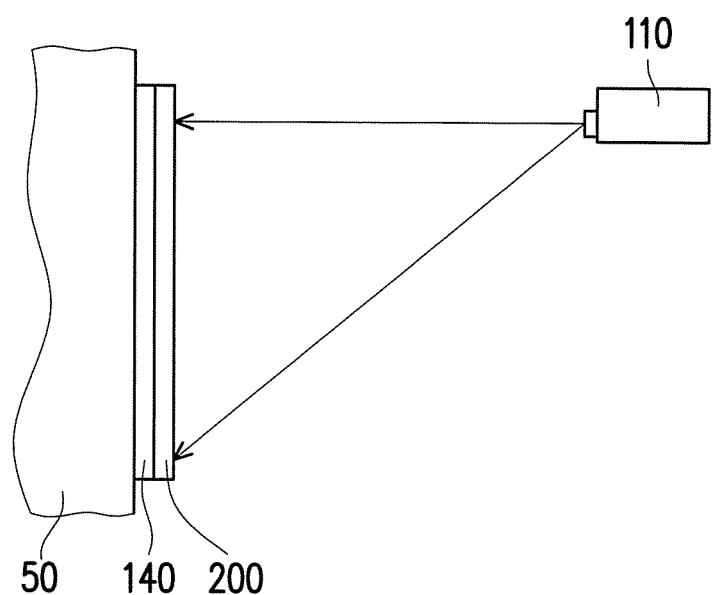
FIG. 11 is a schematic diagram of a part of a projection system according to another embodiment of the invention.

FIG. 11 is a schematic diagram of a part of the projection system according to another embodiment of the invention. Referring to FIG. 11, a difference between the embodiment and the embodiment of FIG. 10 lies in a different touch device. The touch device 140 of the embodiment is fixed at a fixing end 50, and the fixing end 50 is, for example, a wall or other proper leaning surface. The touch device 140 includes a flexible capacitive touch film disposed between the projection target 200 and the fixing end 50, for example, the projection target 200 is a white reflection film, and the flexible capacitive touch film is adhered to a back surface of the projection target 200 or the touch device 140 is a rigid capacitive touch panel for receiving a touch signal. Moreover, since enough instructions and recommendations for the image projection method of the embodiment of the invention can be learned from the description of the embodiments of FIG. 1 to FIG. 7, detailed description thereof is not repeated.

In summary, the embodiments of the invention have at least one of following advantages or effects. In the embodiment of the invention, the projector pre-stores the second image, and combines the first image with the second image in the first display mode. A combination position of the first image relative to the second image may be adjusted according to the control signal, so as to decrease the setup cost of the projection system. Moreover, the projector can be arbitrarily switched between a plurality of display modes according to a setting, so as to improve use convenience.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims.

What is claimed is:

1. A projector, electrically connected to a host system, comprising:
   an image processing circuit, configured to adjust a first image, wherein the first image is an output from the host system, wherein the projector is physically separated from the host system and the first image is formed by combining touch information corresponding to projection coordinates of the projector with an original image, wherein the image processing unit is configured to receive the projection coordinates provided by the host system which is configured to convert coordinates of position information of a touch object on a projection target into the projection coordinates, where the position information of the touch object is provided by a touch device electrically connected to the host system;
   a processor circuit, electrically connected to the image processing circuit; and
   a memory circuit, electrically connected to the processor circuit, and configured to prestore a second image, wherein the second image is a predetermined image, wherein
   when the projector is in a first display mode, the processor circuit is adapted to combine the first image with the second image to generate a display image so as to project the display image to the projection target via the projector,
   when the projector is in a second display mode, the projector is configured to project the first image to the projection target without projecting the predetermined second image, and
   when the projector is in a third display mode, the projector is adapted to project the predetermined second image to the projection target without receiving and projecting the first image from the host system,
   and the projector further displays the touch information received from the host system on the second image after switching from the first display mode to the third display mode.

2. The projector of claim 1, wherein the processor circuit controls a position of the first image relative to the second image according to a control signal.

3. The projector of claim 2, wherein the control signal is selected from one of a gesture, a touch signal and an output signal of a remote controller.

4. The projector of claim 1, wherein the image processing circuit is configured to receive the first image from the host system, and the host system is disposed outside of the projector and configured to display the first image.

5. The projector of claim 1, wherein the projection target is selected from one of a physical blackboard, a physical whiteboard and a projection screen.

6. The projector of claim 1, further comprising:
   a light valve control circuit, electrically connected to the processor circuit, wherein the processor circuit provides image information to the light valve control circuit according to a control signal, and the light valve control circuit controls a light valve to project the display image formed by combining the first image and the second image to the projection target, so as to dynamically adjust the position of the first image relative to the second image.

7. An image projection method, adapted to a projector and a host system, the image projection method comprising:
   receiving a first image which is an output from the host system, and adjusting the first image by the projector, wherein the projector is physically separated from the host system and the first image is formed by combining touch information corresponding to projection coordinates of the projector with an original image, wherein the projector is configured to receive the projection coordinates provided by the host system which is configured to convert coordinates of position information of a touch object on a projection target into the projection coordinates, where the position information of the touch object is provided by a touch device electrically connected to the host system;
   switching the projector between a first display mode, a second display mode and a third display mode;
   combining the first image with a second image to generate a display image so as to project the display image to the projection target via the projector when the projector is in the first display mode, wherein the second image is a predetermined image pre-stored in a memory circuit of the projector;
   projecting the first image to the projection target and not projecting the predetermined second image when the projector is in the second display mode; and
   projecting the predetermined second image to the projection target by the projector when the projector is in the third display mode without receiving and projecting the first image from the host system, and further displaying the touch information received from the host system on the second image by the projector after switching from the first display mode to the third display mode.

8. The image projection method of claim 7, further comprising:
   controlling the position of the first image relative to the second image according to a control signal.

9. The image projection method of claim 8, wherein the control signal is selected from one of a gesture, a touch signal and an output signal of a remote controller.

10. The image projection method of claim 7, wherein the first image is an image displayed by the host system.

11. The image projection method of claim 7, wherein the projection target is selected from one of a physical blackboard, a physical whiteboard and a projection screen.

12. The image projection method of claim 7,
wherein, in the second display mode of the projector, the projector projects the first image displayed on a display screen of the host system to the projection target.

13. A projection system, comprising:
a projector, configured to adjust a first image;
a host system, electrically connected to the projector, and configured to display the first image; and
a touch device, electrically connected to the projector and the host system, and configured to output a touch signal, wherein
when the projector is in a first display mode, the projector is adapted to combine the first image with a second image to generate a display image so as to project the display image to a projection target via the projector,
when the projector is in a second display mode, the projector is configured to project the first image to the projection target without projecting the second image, and
when the projector is in a third display mode, the projector is adapted to project the second image to the projection target without receiving and projecting the first image from the host system, wherein the second image is a predetermined image prestored in the projector,
wherein the projector receives the first image from the host system, the projector is physically separated from the host system, the host system is adapted to convert coordinates of position information of a touch object on the projection target into projection coordinates of the projector, wherein the position information is captured by the touch device, and the host system is adapted to combine touch information corresponding to the projection coordinates of the projector with an original image to form the first image in the first display mode and provide the touch information to the projector to display on the second image in the third display mode after switching from the first display mode to the third display mode, and
wherein a position of the first image relative to the second image is adjusted using the touch object.

* * * * *